United States Patent
Feiken

[19]

[11] Patent Number: 5,974,145
[45] Date of Patent: Oct. 26, 1999

[54] METHOD FOR CANCELLING A TRANSACTION OF AN ELECTRONIC PAYMENT MEANS, AS WELL AS PAYMENT MEANS FOR APPLICATION OF THE METHOD

[75] Inventor: Albertus Feiken, Amstelveen, Netherlands

[73] Assignee: Koninklijke KPN N.V., Groningen, Netherlands

[21] Appl. No.: 08/738,077

[22] Filed: Oct. 25, 1996

[30] Foreign Application Priority Data

Oct. 26, 1995 [NL] Netherlands ............... 1001509

[51] Int. Cl.⁶ ............................................. H04L 9/00
[52] U.S. Cl. ............................................. 380/24
[58] Field of Search ................... 380/24, 25; 705/39, 705/40, 41, 42, 43, 44; 235/380

[56] References Cited

U.S. PATENT DOCUMENTS

| 4,877,946 | 10/1989 | Ando et al. | 235/380 |
| 5,220,501 | 6/1993 | Lawlor et al. | 364/408 |
| 5,699,528 | 12/1997 | Hogan | 395/240 |
| 5,793,027 | 8/1998 | Baik | 235/380 |
| 5,815,657 | 9/1998 | Williams et al. | 235/380 |

FOREIGN PATENT DOCUMENTS

| 0 061 373 | 9/1982 | European Pat. Off. . |
| 0 268 106 | 5/1988 | European Pat. Off. . |
| 0 621 570 | 10/1994 | European Pat. Off. . |
| 0 627 714 | 12/1994 | European Pat. Off. . |
| 0 637 004 | 2/1995 | European Pat. Off. . |
| 0 643 371 | 3/1995 | European Pat. Off. . |
| 2 667 192 | 3/1992 | France . |
| 35 16 358 | 11/1986 | Germany . |
| WO 89/02140 | 3/1989 | WIPO . |

OTHER PUBLICATIONS

NTZ Nachrichtentechnische Zeitschrift, vol. 39, No. 11, pp. 754–759, Nov. 1986, Wolfgang Heberle, et al., "Öffentliches Kartentelefon Fur Wert– Und Kreditkarten".

*Primary Examiner*—Salvatore Cangialosi
*Attorney, Agent, or Firm*—Oblon, Spivak, McClelland, Maier & Neustadt, P.C.

[57] ABSTRACT

A method and system for cancelling payments effected with an electronic payment device (11), such a smart card or IC card, in an off-line payment system including transmitting a check value, such as a random number, from a protected storage module of a terminal (12) to the payment device (11) and subsequently checking the check value in the payment device (11). After performing a positive check, a last transaction in a memory of the payment device (11) is cancelled, for example, by decrementing a pointer.

30 Claims, 3 Drawing Sheets

METHOD FOR CANCELLING A TRANSACTION OF AN ELECTRONIC PAYMENT MEANS, AS WELL AS PAYMENT MEANS FOR APPLICATION OF THE METHOD

BACKGROUND OF THE INVENTION

1. Field of the Invention:

The invention relates to a method for cancelling a payment transaction with an electronic payment means, such as a so-called smart card or chip card. The invention further relates to a payment means for application of the method, as well as to a payment system in which the method is applied.

2. Discussion of Background:

Electronic payment means, such as debit cards provided with an integrated circuit (chip cards), are known in practice. Payment systems which make use of electronic payment means, can be subdivided into so-called on-line systems, in which a payment station (such as an electronic cash register) exchanges data with a payment institution (such as a bank) during a transaction, and off-line systems, where such a data exchange does not need to be carried out during each transaction. In off-line systems, the insusceptibility to fraud is entirely dependent upon the protections which are built into the payment means and the payment station, since no verification is carried out at the payment institution.

There exists a need to be able to cancel payment transactions. For payment transactions which are effected with cash it is usually no problem to refund excess money paid or money paid wrongly, for example if an error is made in a payment transaction or if a customer on second thoughts decides not to purchase a certain article. In electronic payment systems the problem arises that restitution of money, for example by incrementing a card balance, is in general not possible in order to rule out misuse. Particularly in the off-line systems mentioned this is a problem, since no verification of the payment means or of the transaction is possible at the payment institution concerned. The state of the art does not supply an explicit solution for this problem.

European Patent Application EP 0,637,004 discloses a method for devaluing debit cards in a protected manner, in which the exchange of data between debit card and payment station takes place, possibly during a card verification routine. There is no question of cancelling the debited amount, however.

European Patent Application EP 0,630,027 discloses a method for writing a memory (EEPROM) on an electronic debit card (smart card) in a protected way, with the object of preventing the accidental erasure of data. Cancelling a completed transaction is not described in said document.

European Patent Application EP 0,627,714 discloses a device for effecting transactions with a card. With the aid of this prior art device, transactions can be cancelled if certain cancel data are available. However, this publication does not disclose what these cancel data consist of and in which way the cancellation is carried out. Neither does a protection protocol appear to be used.

The prior art, therefore, does not offer a method and a device for cancelling, in a protected manner, a transaction with an electronic debit card in an off-line system.

SUMMARY OF THE INVENTION

The object of the invention is to eliminate the above-mentioned and other disadvantages of the prior art and to provide a method which makes it possible to cancel payments effected with an electronic payment means within a period of time which is set to that end.

In particular, the object of the invention is to provide a method which, under certain circumstances, in a protected environment, makes it possible to increment a card balance without intermediation of the supporting system.

A method for cancelling a payment transaction with an electronic payment means and a payment station, which payment station is provided with a storage module for the storage of payment data, and for which payment transaction a transaction value and a check value are stored in the payment means and in the payment station, comprises according to the invention:

generating, in the payment station, a cancel command;

generating, in the storage module, cancel data in response to the cancel command, said cancel data comprising the transaction value and the check value;

decrementing, in the storage module, a counter value by the transaction value;

transferring the cancel data to the payment means;

checking the cancel data in the payment means;

incrementing, in the payment means and dependent upon the checking of the cancel data, a counter value by the transaction value.

In this manner it is possible, in a protected environment, to increment a balance of the payment means as represented by a counter value. It will be clear that the term "counter value" is used in this text to denote a value, such as a sum of expenditures, which, for example, is maintained in a counter. The value concerned, however, does not need to be stored in an (electronic) counter and could just as well be stored in a memory location of a RAM type memory. In this regard it should be observed that, between payment systems, the terms "incrementing" and "decrementing" of counter values can be interchangeable, since incrementing a negative value, for example, is equivalent to decrementing a positive value.

The transaction value is the value (the amount) of the transaction which was carried out last and will, in general, correspond to the difference between the counter value after the transaction which was carried out last, and that before the transaction which was carried out last.

The cancel data are formed, for example, by means of a cryptographic process from at least the transaction value and the check value.

The check value preferably comprises a random number (random value) or is derived from a random number, for example by means of a cryptographic process. In this connection, the check value provides a unique identification of the transaction which is to be cancelled.

The method according to the invention makes it possible to increment a balance of a payment means without a special cryptographic key which is required for revaluing, and without making use of a supporting system (among which a payment institution), since use is made of the stored transaction value and check value.

The invention further provides an electronic payment means which is adapted to the implementation of the method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
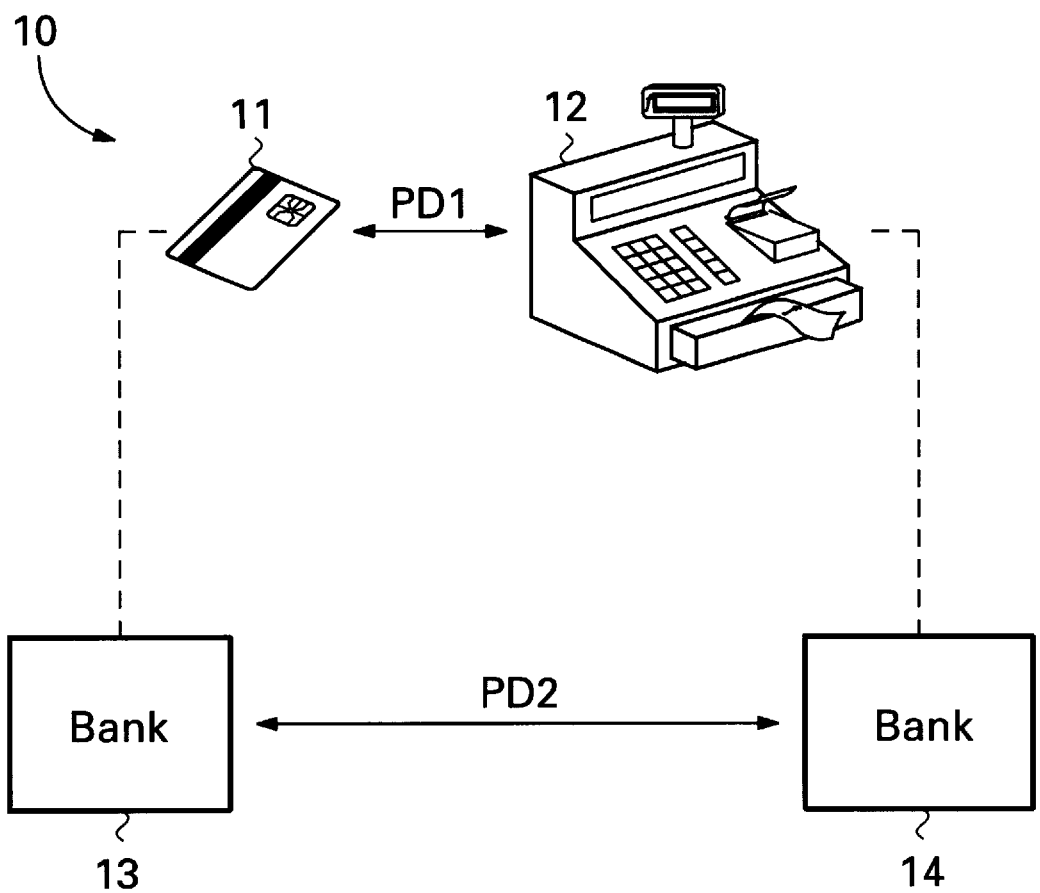
FIG. 1 diagrammatically shows a payment system in which the method according to the invention is applied.

Referring now to the drawings, wherein like reference numerals designate identical or corresponding parts throughout the several views, and more particularly to FIG. 1 thereof, there is illustrated a system 10, by way of example, including an electronic payment means, such as a so-called chip card or smart card 11, a payment station 12, a first payment institution 13, and a second payment institution 14. The payment station (terminal) 12 is shown in FIG. 1 as a cash register, but can in principle comprise a card reader only. The payment institutions 13 and 14, both designated as bank in FIG. 1, can not only be banks but also further institutions which have means (computers) at their disposal for settling payments. In practice, the payment institutions 13 and 14 can form one payment institution. The payment means 11 comprises in the example shown a substrate and an integrated circuit, said circuit being arranged for executing (payment) transactions. The payment means can also comprise an electronic wallet.

During a transaction, an exchange of payment data PD1 takes place between the payment means 11 and the payment station 12. The payment means 11 is associated with the payment institution 13, while the payment station 12 is associated with the payment institution 14. After a transaction, a settlement takes place between the payment institutions 13 and 14 by the exchange of payment data PD2, which are derived from the payment data PD1. In principle, no communication takes place between the payment station 12 and the payment institution 14 concerned during a transaction (so-called off-line system). Transactions must therefore be carried out under controlled circumstances to ensure that no misuse of the system can take place. Such a misuse can consist of, for example, incrementing the balance of the payment means 11 without this being covered by a corresponding change of balance on a counterpart account at the payment institution 13.

Figure 2:
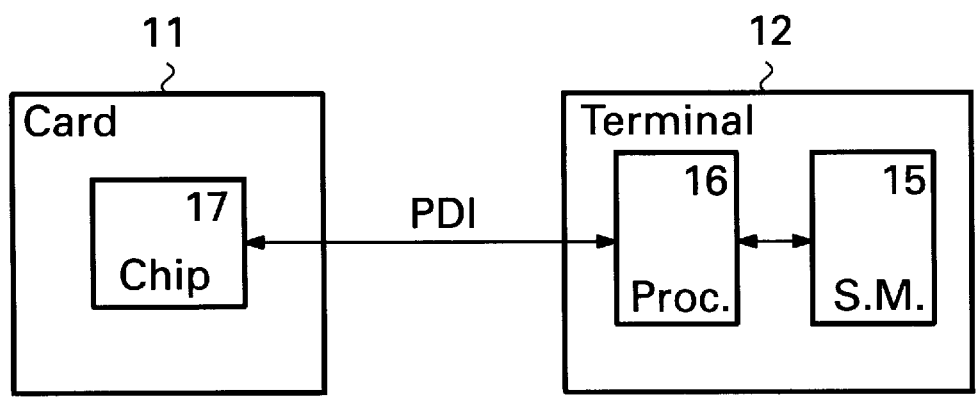
FIG. 2 diagrammatically shows an electronic payment means and a payment station.

In FIG. 2 the payment means 11 and the payment station 12 of FIG. 1 are further diagrammatically shown. As was mentioned in the above, the payment means 11 is provided with an integrated circuit (chip) 17. The payment station (terminal) 12 comprises in the case shown a preferably protected storage module (secure module or security module, designated as "S.M.") 15 and a terminal processor (designated as "Proc.") 16. The terminal processor 16 forms that part of the terminal which, among others, takes care of the data exchange between the payment means 11 and the security module 15. Further, the terminal processor 16 can, for example, comprise cryptographic means for encrypting data (see also U.S. patent application 08/703,824 and corresponding European Patent Application EP 0,630,027 mentioned above). The storage module or security module 15 preferably comprises a protected, removable unit containing payment data, among which balance values. It will be clear, however, that the storage or security module 15 can also be integrated in the terminal processor 16. In principle, the exchange of payment data PD1 takes place between the integrated circuit 17 and the terminal processor 16, a further exchange of data taking place between the terminal processor 16 and the security module 15 if these latter form separate units.

Figure 3:
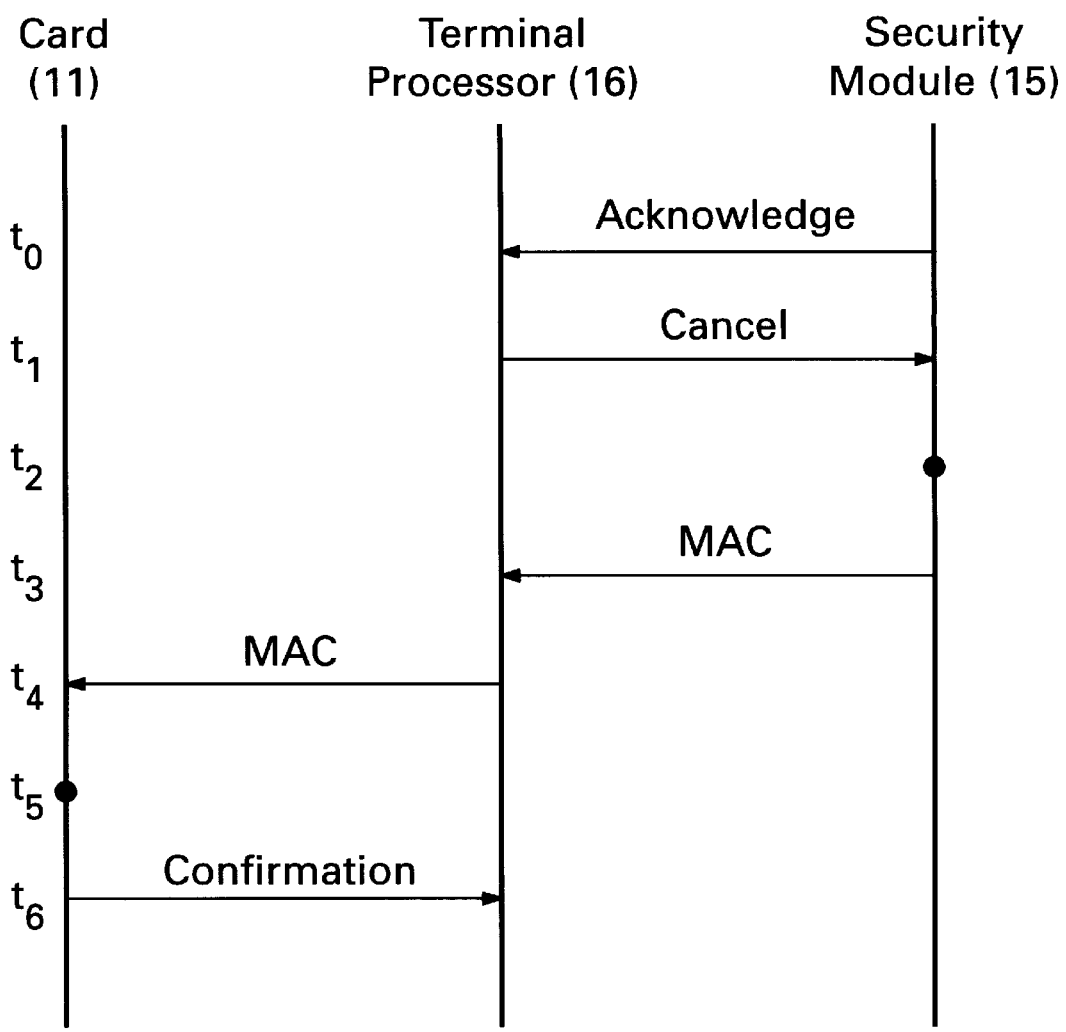
FIG. 3 diagrammatically shows a part of a protocol for executing payment transactions, in which the invention is applied.

In FIG. 3, by way of example, a part of the payment protocol is diagrammatically shown, successive points in time being shown one below the other. The protocol, as shown in FIG. 3, comprises a data exchange between (the integrated circuit 17 of) an electronic payment means (designated as "Card") 11, a terminal processor 16 and a security module 15. Protocols of this kind, which however do not include the cancellation of a payment transaction, are described in, for example, U.S. patent application 08/703,824 (Van de Pavert) and U.S. Pat. No. 5,495,098 (Pailles et al.), both incorporated by reference in this text.

At the point in time $t_0$, the terminal processor 16 receives an answer from the security module 15 to a command, such as "verify balance". What is shown in FIG. 3 is preceded by a payment transaction which in its details is not essential for the present invention. Before the point in time $t_0$, a protocol is completed in which for example occur: an identification step in which the identity or at least authenticity of the payment means is established; at least one verification step in which the balance of the payment means is checked, for example with a random number (random value) generated by the security module and a cryptographic process as security measures; decrementing a balance in the payment means, for example also with the aid of a random number generated by the payment means and a cryptographic process as security measures; and subsequently incrementing a balance in the security module, in which a (third) random number, generated by the security module, can also be applied for verification and prevention of so-called replay. The cryptographic processes can, for example, comprise the encryption of the combination of a (decremented) value and a random number.

In the case shown, it is assumed that at the point in time $t_0$ in the security module 15 an amount (A) and a random number (R) are stored, in which the random number (R) concerned can correspond to the second random number of said example generated by the payment means. In this connection, the amount (A) corresponds with the transaction value, that is to say the value of the transaction which was carried out last.

At, or about, the point of time $t_0$ the payer (holder of the payment means 11) discovers that the payment must be cancelled, for example because an error has been made (incorrect amount). To this end he enters, for example on a keyboard of the terminal 12, a cancel command, for example by pressing a thereto implemented cancel key. If required, the user, for verification, can be obliged to enter the amount to be cancelled as well. The cancel order generates a cancel command in the terminal processor 16.

At the point in time $t_1$, the terminal processor 16 transfers the cancel command to the security module 15 (this transferring is shown in FIG. 3 by means of arrows). At the point in time $t_2$, the balance value concerned is decremented by the amount (A) which was stored in the security module. The security module 15 also generates a cancellation authentication code ("MAC": Message Authentication Code) using the random number (R) which was also stored in the security module, and the decremented balance value. The combination of these two steps is shown in FIG. 3 by means of a dot.

At the point in time $t_3$, the security module 15 transfers the cancellation authentication code to the terminal processor 16, after which this code, at the point in time $t_4$, is transferred to the payment means 11. Subsequently, at the point in time $t_5$, the cancellation authentication code is checked in the payment means 11 with the aid of the random value (R), which was also stored in the payment means. If the result of this check is positive, the balance in the payment means is incremented, for example in the manner which later will be further explained with reference to FIG. 4. The combination of these two steps, that is to say, the checking and the adapting (in this case, incrementing) of the balance, is shown in FIG. 3 by means of a dot.

Finally the payment means emits a confirmation signal to the terminal processor 16 at the point in time $t_6$, indicating that the cancellation has been successfully completed. The confirmation, if required in combination with the revised card balance, can be made known to the holder of the payment means.

It is observed that it has been assumed in the above that the terminal processor 16 and the security module 15 form two separate units, which are preferably accommodated in one housing (of the payment station). It is also possible, however, that the security module 15 and the terminal processor 16 form a single unit.

In the above it has been further assumed that the amount (A) and the random number (R), which are associated with the last payment transaction which was carried out, are still stored in the security module and the payment means. In general, this is a requirement for revaluing a payment means in a protected, off-line manner upon cancelling a transaction. Dependent upon the manner of storage, only the last transaction or several transactions of various payment means can be cancelled. In the first case, only the last values (R and A) need to be kept in the payment means and the payment station, cancellation of the last transaction only being possible if, for example, a subsequent customer has not yet made use of the same payment station. In the second case, memory means can be present in the payment station for storing the data (such as R, A and the identity of chip 17) of the last n transactions with n payment means, where n is, for example, 5 or 10. As a measure against possible fraud in both cases, a time limit can be set within which cancellation is possible. Further, after the cancellation, the random number (R) can be rendered unusable in order to prevent a repetition of the cancellation (and with that a repeated revaluing of the payment means). Rendering this number unusable can be done by placing a so-called flag which designates whether the value concerned may be used, or by clearing the value concerned (such as R).

The present invention accordingly also provides a method of performing a payment transaction by means of a smart card, the transaction involving the use of a transaction value (e.g. the amount A) and at least one check value (e.g. random number R), the transaction comprising the steps of storing the transaction value (A) and the check value (R). The storing may be temporary, e.g. for a limited time or for a limited number of subsequent transactions (or until the next transaction), as set out above.

Figure 4:
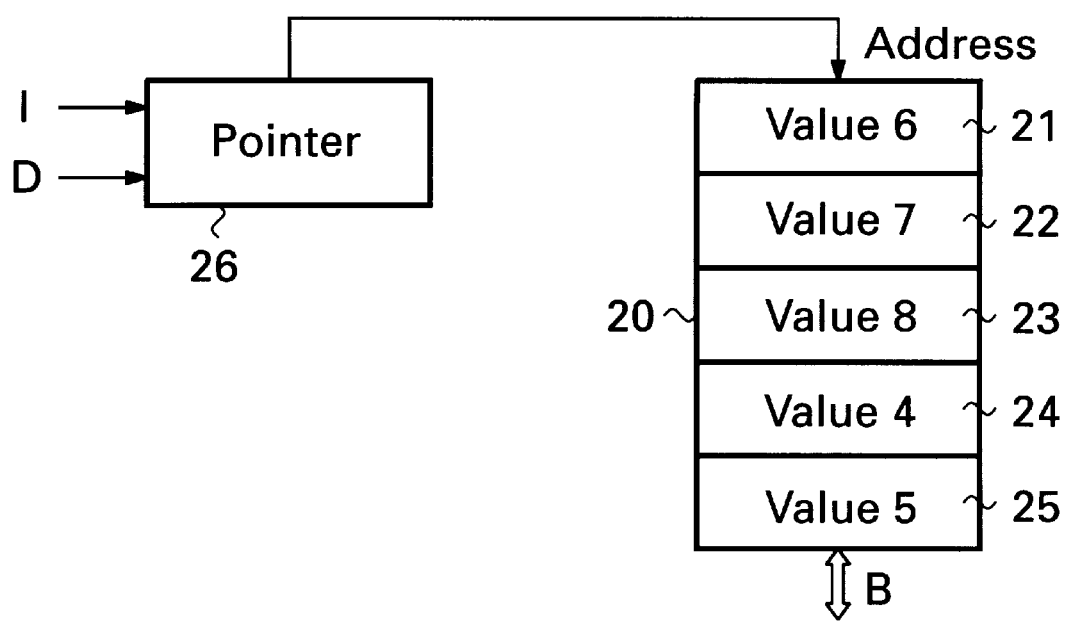
FIG. 4 diagrammatically shows a memory device of an electronic payment means, in which the invention is applied.

The memory parts of an electronic payment means 11 which are diagrammatically shown in FIG. 4 comprise a memory 20 and a pointer register 26. The memory 20 comprises a number of memory locations 21–25. A pointer, stored in the pointer register 26, indicates which memory location of the memory locations 21–25 is in use. The content of the pointer register 26 can be changed by means of control signals I (increment) and D (decrement).

A first value (e.g. Value 4 in FIG. 4) is, for example, written in memory location 24, the pointer register containing the address of this memory location. A subsequent second value (Value 5) is written in memory location 25, after the content of register 26 has been incremented by one. Similarly, a subsequent third value (Value 6) is stored in memory location 21, using the cyclical nature of the memory 20. The pointer stored in pointer register 26 is accordingly adjusted (by e.g. incrementing or resetting the register) to contain the address of memory location 21.

In the situation shown in FIG. 4, the last value written (i.e. Value 8) has been written in memory location 23, the value occupying memory location 23 prior to that (i.e. Value 3) being written over, i.e. erased by storing another value in the same memory location. In this situation, the register 26 contains the address (pointer) of memory location 23. The said values (Values 4–8) are, for example, balances of the payment means. Via a data bus B the values can be transferred to and from other parts of the electronic payment means 11 which are not shown in FIG. 4 for the sake of clarity.

As stated above, the memory 20 forms a so-called cyclic memory: the memory locations 21–25 are traversed cyclically, the pointer in the register 26 containing the next address each time a following value is written, and the address of memory location 21 following after the address of memory location 25. The number of memory locations can vary, but is at least two for a cyclical memory. By using the memory locations alternately in this way the memory is subjected to less wear, whereby the lifespan is increased.

With such a cyclic memory a payment transaction, dependent upon a cancel command, can be cancelled in several ways.

In a first embodiment, the payment is cancelled by decrementing the pointer (register 26) by one, thus setting it back one position. In the case of FIG. 4 the pointer, in this regard, is set back from memory location 23 to 22. Memory location 22 thereby indicates the previous value (i.e. Value 7).

In a second embodiment, the pointer remains in the last position it took up, but the memory location concerned is cleared or overwritten, so that in that location (memory location 23 in the example shown) a new value can be written. In FIG. 4, after the cancelling (of one transaction), the memory locations 22 and 23 will both contain Value 7, memory location 23 being addressed by the pointer.

In a third embodiment, both the pointer is incremented and the memory location concerned is cleared or overwritten, so that in FIG. 4 the memory location 24 is addressed by the pointer and Value 7 is written again at the location of Value 4. In that case, memory location 23 can still contain the non-cancelled value, which is however no longer the current value.

It will be clear that the invention can also be applied in payment means having non-cyclical memories. In that case, a memory location can be overwritten repeatedly. It will further be clear that the actual cancellation in the memory, as described above, can in principle take place independently of the way in which a cancel command was effected.

As is explained in the above, a payment transaction is cancelled according to the invention by a special instruction, with use advantageously being made of the properties of commonly applied memories.

It will be understood by those skilled in the art that the invention is not restricted to the embodiments shown, and that many modifications and additions are possible without departing from the scope of the invention.

What is claimed as new and desired to be secured by Letters Patent of the United States is:

1. An off-line method of cancelling a payment transaction with a smart card or IC card and a payment station, the payment station being provided with a storage module for the storage of payment data, for which the payment transaction, a transaction value and a check value are stored in the smart card or IC card and in the payment station, said method comprising the steps of:

generating, in the payment station, a cancel command;

generating, in the storage module, cancel data in response to the cancel command, said cancel data comprising the transaction value and the check value;

decrementing, in the storage module, a counter value with the transaction value;

transmitting the cancel data to the smart card or IC card;

checking the cancel data in the smart card or IC card; and incrementing, in the smart card or IC card and dependent upon the checking of the cancel data, a counter value with the transaction value.

2. The method according to claim 1, wherein the step of generating the cancel data comprises forming the cancel data by means of a cryptographic processing of at least the transaction value and the check value.

3. The method according to claim 1, wherein the step of generating the cancel data comprises generating the check value comprising a random number.

4. The method according to claim 1, further comprising the step of clearing the check value after the cancellation of a payment.

5. The method according to claim 1, further comprising the step of integrating the storage module in the payment station.

6. The method according to claim 1, wherein the step of incrementing the counter value comprises decrementing a pointer value of a cyclic memory.

7. The method according to claim 1, wherein the step of incrementing the counter value comprises overwriting the last written counter value.

8. The method according to claim 7, wherein the step of incrementing the counter value comprises incrementing of a pointer value of a cyclic memory.

9. An off-line method of performing a payment transaction by means of a smart card or IC card and a payment station, the transaction involving the use of a transaction value and at least one check value, the transaction comprising the steps of:

storing the transaction value; and storing the check value.

10. The method according to claim 9, further comprising the step of providing the payment station with a storage module for the storage of payment data, the transaction value and the check value.

11. The method according to claim 9, further comprising the step of invalidating the transaction value and the check value when a subsequent transaction is initiated.

12. An off-line electronic smart card or IC card, comprising;

a substrate and an integrated circuit mounted thereon;

said integrated circuit comprising processing means for processing data; and storage means for storing data;

wherein said storage means comprises several memory locations and a cyclical pointer register, and is arranged for incrementing the pointer register for writing a value in a memory location; and the storage means is arranged for decrementing the pointer register in response to a cancel command.

13. The electronic smart card or IC card according to claim 12, wherein the storage means are further arranged for the storage of at least a check value and a transaction value, and for checking a cancel command on the basis of the check value.

14. An off-line system for effecting electronic payments, comprising:

at least one smart card or IC card;

at least one payment station; and a payment institution;

wherein the at least one payment station is provided with a storage module for the storage of payment data;

in the system the at least one smart card or IC card and the at least one payment station are arranged for carrying out a payment transaction;

the payment transaction a transaction value, and a check value are stored in the smart card or IC card and in the payment station; and the system is arranged for cancelling a payment transaction by providing:

means for generating, in the payment station, a cancel command;

means for generating, in the storage module, cancel data in response to the cancel command, said cancel data comprising the transaction value and the check value;

means for decrementing, in the storage module, a counter value with the transaction value;

means for transmitting the cancel data to the smart card or IC card;

means for checking the cancel data in the smart card or IC card; and means for incrementing, in the smart card or IC card and dependent upon the checking of the cancel data, a counter value with the transaction value.

15. The system according to claim 14, wherein the means for generating the cancel data forms the cancel data by cryptographic processing of at least the transaction value and the check value.

16. The system according to claim 14, wherein the check value comprises a random number.

17. The system according to claim 14, wherein the system includes means for clearing the check value after the cancellation of a payment.

18. The system according to claim 14, wherein the storage module is integrated in the payment station.

19. The system according to claim 14, wherein the means for incrementing the counter value includes means for decrementing a pointer value of a cyclic memory.

20. The system according to claim 14, wherein the means for incrementing the counter value includes means for overwriting the last written counter value.

21. The system according to claim 20, wherein the means for incrementing the counter value includes means for incrementing of a pointer value of a cyclic memory.

22. The method according to claim 1, further comprising the step of cancelling or disabling the check value in both the smart card or IC card and the payment station after the cancellation of a payment.

23. The method according to claim 9, further comprising the step of cancelling or disabling the check value in both the smart card or IC card and the payment station after the cancellation of a payment.

24. The electronic smart card or IC card according to claim 12, wherein the smart card or IC card includes means for cancelling or disabling the check value in both the smart card or IC card and the payment station after the cancellation of a payment.

25. The system according to claim 14, wherein the system includes means for cancelling or disabling the check value in both the smart card or IC card and the payment station after the cancellation of a payment.

26. An off-line method of cancelling a payment transaction with a smart card or IC card and a payment station, the payment station being provided with a storage module for the storage of payment data, for which the payment transaction, a transaction value and a check value are stored in the smart card or IC card and in the payment station, said method comprising the steps of:

generating, in the payment station, a cancel command;

generating, in the storage module, cancel data in response to the cancel command, said cancel data comprising the transaction value and the check value;

decrementing, in the storage module, a counter value with the transaction value;

transmitting the cancel data to the smart card or IC card;

checking the cancel data in the smart card or IC card; and storing, in the smart card or IC card, dependent on the checking of the cancel data, a balance corresponding to a previous balance.

27. The method according to claim 26, wherein the step of storing the balance comprises incrementing a pointer value of a cyclic memory.

28. An off-line electronic smart card or IC card, comprising:

a substrate and an integrated circuit mounted thereon;

said integrated circuit comprising processing means for processing data; and storage means for storing data;

wherein said storage means is arranged for storing, dependent upon checking of cancel data, a balance corresponding to a previous balance.

29. The electronic smart card or IC card according to claim 28, further comprising means for incrementing a pointer value of a cyclic memory prior to the storing of the balance corresponding to the previous balance in said storage means.

30. An off-line system for effecting electronic payments, comprising:

at least one smart card or IC card;

at least one payment station; and a payment institution;

wherein the at least one payment station is provided with a storage module for the storage of payment data;

in the system the at least one smart card or IC card and the at least one payment station are arranged for carrying out a payment transaction;

the payment transaction, a transaction value, and a check value are stored in the smart card or IC card and in the payment station; and the system is arranged for cancelling a payment transaction by providing:

means for generating, in the payment station, a cancel command;

means for generating, in the storage module, cancel data in response to the cancel command, said cancel data comprising the transaction value and the check value;

means for transmitting the cancel data to the smart card or IC card;

means for checking the cancel data in the smart card or IC card;

means for storing, in the smart card or IC card, dependent on the checking of the cancel data, a balance corresponding to a previous balance; and means for incrementing a pointer value of a cyclic memory prior to the storing of the balance corresponding to the previous balance in said storage means.

* * * * *